United States Patent [19]

Wright et al.

[11] 3,935,851

[45] Feb. 3, 1976

[54] FUEL METERING SYSTEM FOR SPARK IGNITION ENGINES

[75] Inventors: William Paul Wright; Leroy Shafer; John Ondocsin, all of Huntsville, Ala.; Ivor W. Carter, Grosse Pointe Woods, Mich.

[73] Assignee: Chrysler Corporation, Highland Park, Mich.

[22] Filed: Dec. 26, 1973

[21] Appl. No.: 428,261

[52] U.S. Cl...... 123/139 E; 123/32 EA; 60/39.28 R; 137/101.19; 60/39.28 T

[51] Int. Cl.².....................F02M 39/00; G05D 11/00; F02C 9/04

[58] Field of Search..................... 123/32 EA, 139 E; 60/39.28; 137/101.19, 101.21

[56] References Cited

UNITED STATES PATENTS

| | | | |
|---|---|---|---|
| 2,856,910 | 12/1959 | Goodridge | 123/32 EA |
| 3,128,603 | 4/1964 | Haigh | 123/32 EA |
| 3,470,858 | 9/1967 | Mycroft | 123/32 EA |
| 3,643,635 | 2/1972 | Milam | 123/32 EA |
| 3,780,587 | 12/1973 | Rivere | 123/32 EA |
| 3,788,285 | 1/1974 | Gelin | 123/32 EA |
| 3,789,816 | 2/1974 | Taplin | 123/32 EA |
| 3,817,225 | 6/1974 | Priegel | 123/32 EA |

*Primary Examiner*—Charles J. Myhre
*Assistant Examiner*—Ronald B. Cox
*Attorney, Agent, or Firm*—Talburtt & Baldwin

[57] ABSTRACT

A fuel metering system controlling the mass fuel-air ratio in a spark ignition engine in response to fuel and air volume measurements. Linear responsive transducers respond to various temperatures, pressures, throttle positioning, fuel flow, air flow and engine operation for correcting the volume flow measurements of both fuel and air to mass flow measurements. A positive displacement, dual action pump delivers fuel to the throttle body of the engine in response to the mass of the air entering into the throttle body.

15 Claims, 7 Drawing Figures

FUEL METERING SYSTEM FOR SPARK IGNITION ENGINES

BACKGROUND OF INVENTION

1. Field of Invention

This invention relates to fuel control systems for spark ignition engines in general and to fuel metering systems controlling the fuel-air ratio in the throttle body of the engine.

2. Background of Invention

Fuel control systems for internal combustion engines, other than the conventional carburetor mixing systems, are based on the fuel injection concepts of compression ignition engines. In this type of engine, such as a diesel engine, fuel is directly injected into each cylinder of the engine. Spark ignition engines have this concept extended to injecting fuel into the inlet to each cylinder.

One disadvantage of fuel injection as described above is the requirement of having a somewhat precision injector for each cylinder. This increases the cost of such a system to such a magnitude that makes the system unattractive in the general market place. In addition, control of these injectors is generally responsive to manifold vacuums and engine speeds.

The amount of fuel each cylinder receives is a function of injector timing and not the actual rate of fuel flow. Thus, each cylinder will receive an amount of fuel which may or may not be the desired amount for good combustion.

SUMMARY OF THE INVENTION

It is a principal object of the invention to control the fuel-air ratio in a spark ignition engine for optimum engine operation under all environmental conditions.

It is another object to utilize linear responsive devices for controlling the fuel-air ratio.

It is still another object to provide a fuel metering system for motor vehicles that will be inexpensive in the market place.

It is another object to provide a closed loop fuel control system for greater precision.

These and other objects both expressed and implied will become apparent from the following drawings and detailed description of a fuel metering system for spark ignition engines. The system comprises means for sensing and generating electrical signals representing absolute air pressure, volume of air entering the engine and operator actuated acceleration control and then mixing these signals for generating a variable amplitude pulse representing the mass of the air. Another sensing means generates an electrical signal representing the temperature of the air or fuel and an electrical signal representing the amount of fuel being pumped. These signals are summed together at the input of an integrator and the resultant voltage is then compared with a system balancing signal to generate a motor control signal from the output of the integrator for controlling the amount of fuel pumped to the engine according to a predetermined fuel-air ratio.

DETAILED DESCRIPTION

Figure 1:
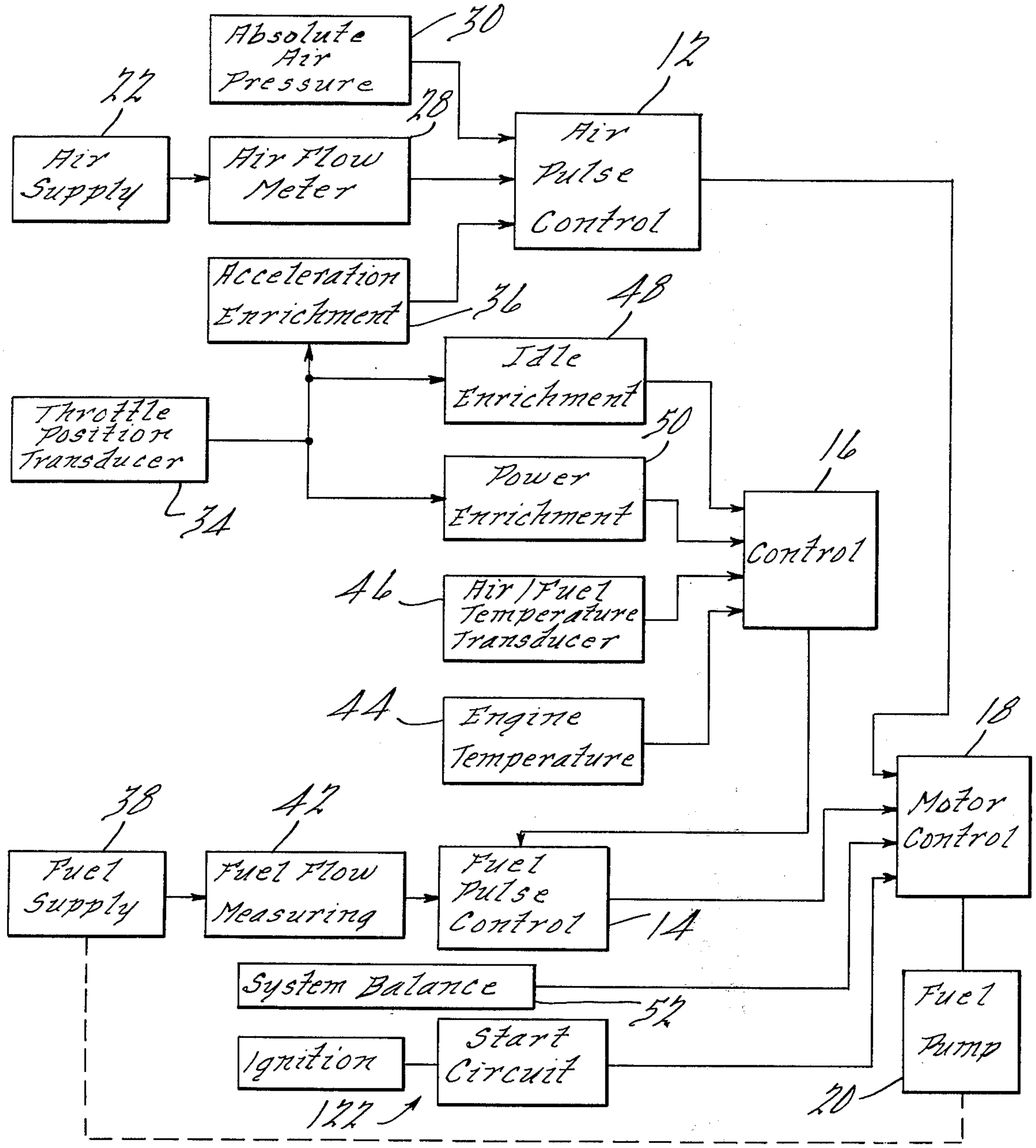
FIG. 1 is a block diagram of one fuel metering system according to the present invention.

Referring to the FIGS. by the characters of reference, there is illustrated in FIG. 1 a block diagram of a fuel metering system of the present invention. The system controls the fuel-air ratio of the mixture in the throttle body of the engine. Typically, this system is applicable to spark ignition internal combustion engines as compression ignition engine (diesel) uses fuel injection where the fuel is injected directly into the engine cylinder.

The system of FIG. 1 controls the flow of fuel to the engine as a function of the mass of air entering the throttle body of the engine. The system is balanced, or compared, against a predetermined fuel-air mass ratio value and by means of closed loop control operates to maintain the actual fuel-air mass ratio in agreement with this predetermined value.

Figure 2:
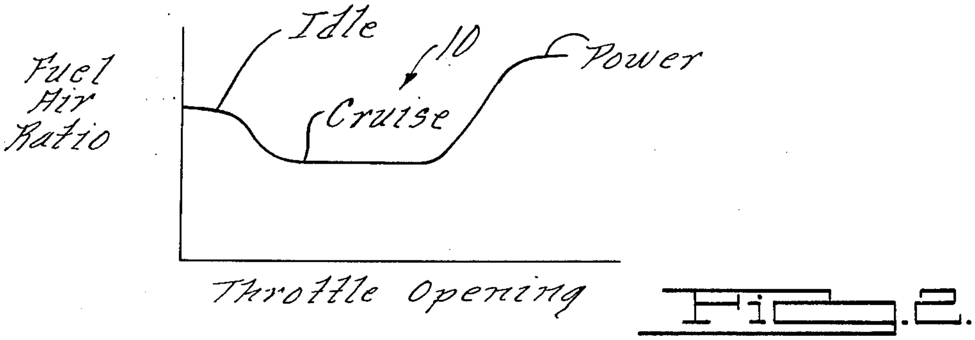
FIG. 2 is a graph plat of fuel-air ratio versus throttle opening for a spark ignition engine.

Referring to FIG. 2 there is graphically illustrated a fuel-air ratio curve 10 as a function of throttle opening. This curve illustrates the variations in ratio for the three general engine operating conditions, namely, idle, cruise and power. Using this curve 10, it is realized that a predetermined fuel-air ratio may be equal to the ratio at cruise and for idle or power the ratio must be increased.

In a closed loop system, a normal or predetermined or balancing condition is defined, and control signals are generated to offset or displace the predetermined condition according to the system operation. This is accomplished in the present system to permit idealized engine performance at any vehicle operation condition.

The normal or predetermined or balancing condition is defined as the fuel-air ratio at essentially a cruise operating condition. Then, in response to the mass of the air 22 entering into the throttle body 11 and the positioning of the throttle valve 13 by the operator, the ratio is modified. This modification causes the fuel pump 20 to pump more fuel into the throttle body 11 in accordance with the new operating condition.

The fuel metering system of FIG. 1 has an air pulse control means 12, a fuel pulse control means 14, a fuel pulse demand control 16 and a motor or pump control means 18. The system is a closed loop system in that the output of the pump 20 is metered by the fuel pulse control means 14 which in turn controls the pump motor 18.

The fuel pump 20 in the present invention is a linear displacement dual-stroke pump capable of pumping fuel on either the forward or return stroke of the pump. The pumping action of the pump is responsive to the amount of power applied to the pump windings. As the fuel-air ratio is unbalanced, the voltage applied to the pump by the motor control unit 18 is increased or decreased thereby respectively delivering more or less fuel to the engine 24 to maintain the actual fuel-air ratio in substantial correspondence with its desired predetermined value.

Air 22 is drawn into the engine 24 through an air cleaner 26 for removing any undesired particles or foreign bodies in the air. An air flow meter 28 is provided in the air cleaner 26 for the purpose for measuring the flow of air therethrough. Positioned within the air flow meter 28 is an air pressure transducer 30 which is responsive to the barometric pressure less any pressure drop in the air flow meter to generate an electrical signal representing the absolute pressure of the air 22 entering the throttle body 11.

Another system parameter in the air control section of the system is the rate of change of the throttle control 32. A transducer 34 is responsive to the positioning of the throttle control and generates an electrical signal. This signal is processed at 36 and during engine acceleration, an enrichment signal is generated.

These three signals representing air volume, absolute pressure and engine acceleration are combined in a pulse generating circuit 12 to generate a series, or train, of pulsed electrical signals. The air volume signal controls the pulse repetition frequency and the pressure and acceleration signals control the pulse amplitude of the pulsed electrical signals. The more air drawn into the throttle body 11, the faster the pulse repetition frequency. Each air control pulse has a constant width and only the repetition frequency and the amplitude are varied.

The fuel control portion of the system is responsive to several parameters for determining a pulsed electrical signal representing the mass of the fuel entering the engine 24. As in the air control system wherein the amount of air flowing into the throttle body 11 is measured, the amount of fuel 38 flowing in fuel delivering lines 40 is also measured by a fuel flow measuring means 42 and an electrical signal is generated therein representing the amount of fuel.

Additional fuel parameters are measured and electrical signals are generated. A temperature transducer 44 monitors the temperature of the engine between cold and up to running temperature. This range is necessary for generating a cold start condition. Once the engine temperature reaches its running temperature, this signal has no control or effect on the fuel control portion.

The temperature of the air or the fuel is measured by a transducer 46 and an electrical signal representing this temperature is generated. The parameter desired is the temperature of the fuel; however, in most spark ignition engines the temperature difference between that of the air and the fuel is generally very small, therefore, in the preferred embodiment, the air temperature is measured.

Two additional control signals are generated exclusively of each other. These signals are illustrated by means of the graph 10 in FIG. 2 and are the idle enrichment signal 48 and the power enrichment signal 50. The source of these signals is the throttle positioning transducer 34 and as illustrated occur at the opposite extremes of throttle valve opening operation. The effect of these signals is to increase the amount of fuel during these periods.

The signal representing the mass amount of fuel flowing is a series, or train, of pulsed electrical signals. The greater the quantity of fuel flowing, the higher the pulse repetition frequency. The other signals representing the engine temperature, the air or fuel temperature, and the enrichment signals control the amplitude of the fuel flow pulses. Each fuel flow pulse has a constant width and only the repetition frequency and the amplitude are varied.

The two pulsed electrical signals representing mass air flow and mass fuel flow are added together and balanced with a third electrical signal representing a predetermined fuel-air ratio. This latter signal is a system balancing signal 52 and as previously indicated is approximately the cruise fuel-air ratio. All three signals are combined in the motor control unit 18 wherein the output controls the pump 20.

The pump 20 alters its fuel pumping capacity according to the magnitude of the voltage applied thereto. The output of the motor control 18 is a varying amplitude signal which is large when more fuel is required. As the fuel is pumped in the fuel delivery lines 40, the amount of fuel is measured and this information is supplied to the fuel control portion 14 of the system therefore providing a closed loop control system.

The throttle 32, which is controlled by the operator, controls the operation of the engine 24. As the throttle valve 13 is opened, as shown in FIG. 2, the air flow into the engine increases. The air flow meter means is responsive to the air flow and supplies electrical signals to the air pulse control means 12. As previously stated, the air pulse control means 12 is coupled to the motor control means 18 for operating the fuel pump 20. The fuel flow measuring means 42 is responsive to the fuel flow and supplies electrical signals to fuel pulse control means 14. The output of the fuel pulse control means 14 is coupled, as stated above, to the motor control means 18 to control the pump 20 thereby maintaining the predetermined fuel-air ratio.

The other signals are correction signals used to correct the air and fuel signals so that the actual fuel-air ratio of the mixture ingested by the engine corresponds to the predetermined fuel-air ratio as expressed in terms of mass measurements. The absolute air pressure signal is used to correct the air signal for mass flow changes due to air pressure changes. The fuel temperature signal is used to correct the fuel signal for mass flow changes due to fuel temperature changes, and since it is presumed that the fuel and air temperatures are equal, this temperature signal could be used to also correct for air temperature changes by appropriate scaling thereof whereby to maintain accuracy in the fuel-air mass ratio.

In the preferred embodiment of the fuel metering system of the present invention, all transducers generate a voltage output which varies linearly with the variations of the parameters being sensed. This linearity provides accuracy in the maintaining of fuel-air ratio thereby allowing repeatability if the engine is undergoing testing for performance or for the reduction of the products of combustion found in emission gases.

Figure 3:
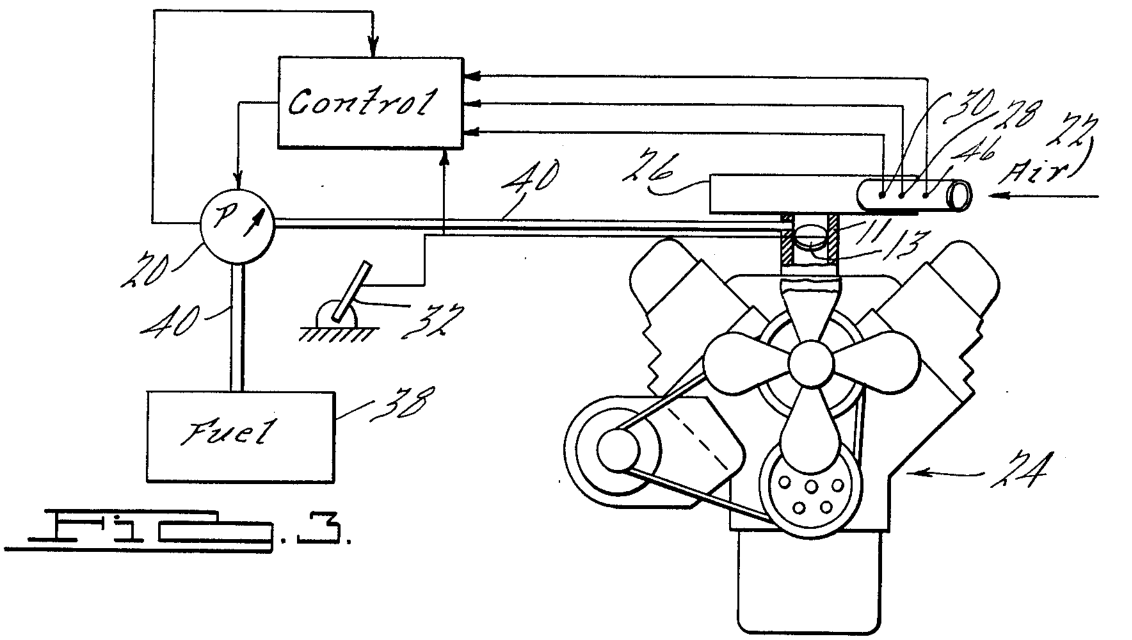
FIG. 3 is a diagrammatic view of a spark ignition engine showing the location of the several sensors and devices of the system.

FIG. 3 is a diagrammatic illustration of a spark ignition engine 24 as may be found in a motor vehicle. Illustrated on the FIG. are the relative locations of several of the transducers and devices of the system of the present invention. Located in the air cleaner 26 and, in particular, in the air inlet pipe are the absolute pressure transducer 30, the air flow meter 28, and the air temperature transducer 46. The air cleaner 26 is connected to the engine 24 by means of the throttle body 11. Located within the throttle body 11 is the throttle valve 13 which is operatively connected to the accelerator pedal 32 or operator control member and the fuel delivery line 40.

The movement of the accelerator pedal 32 is translated into an electrical signal and supplied to the control module. Also connected to the control module are signal lines from the absolute pressure transducer, the air flow meter, and the temperature transducer. The output of the control module is connected to the fuel pump 20 for pumping fuel from the fuel tank 38 to the throttle body 11.

Figure 4:
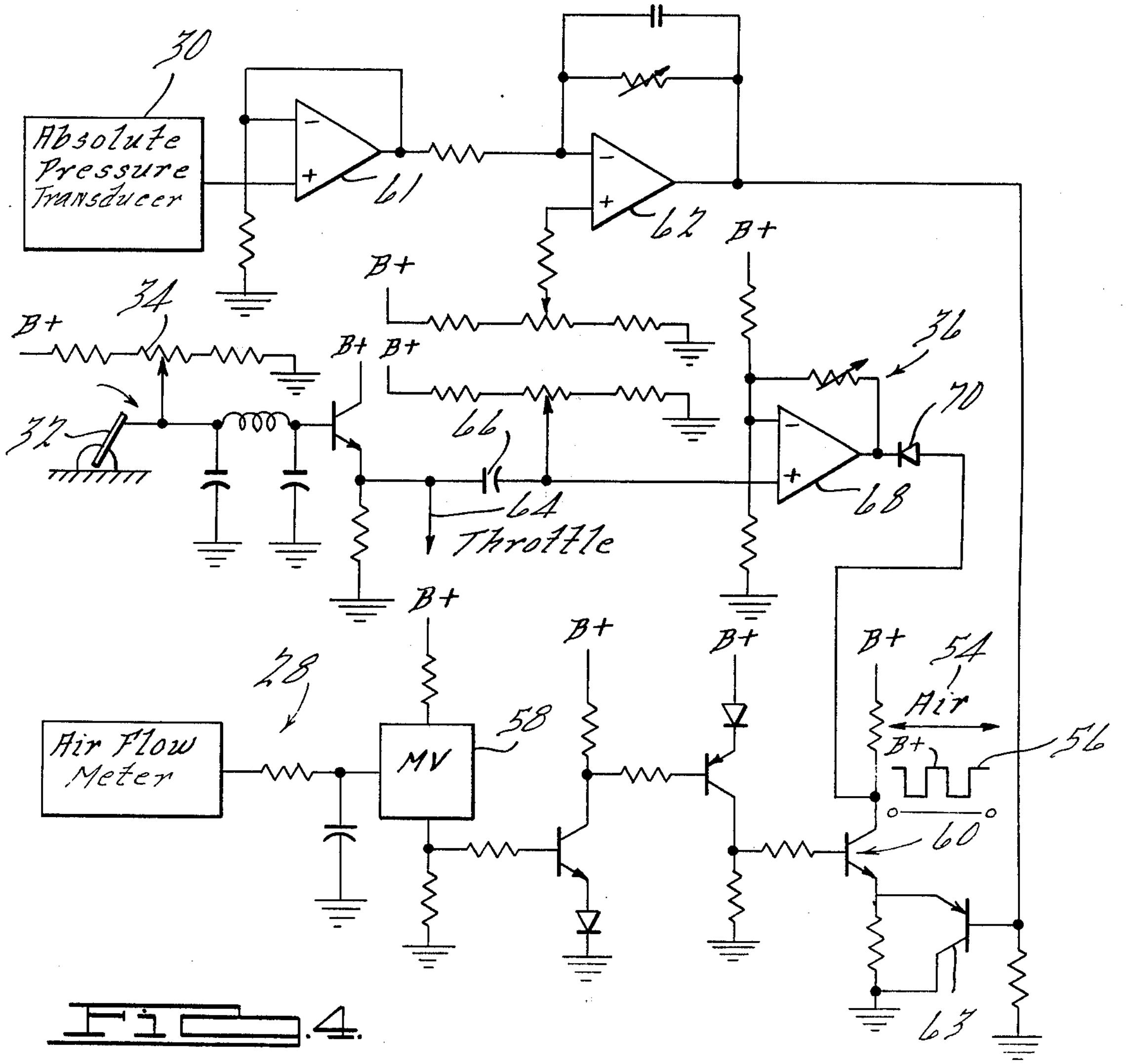
FIG. 4 is a schematic of the air signal generation circuitry.
Figure 5:
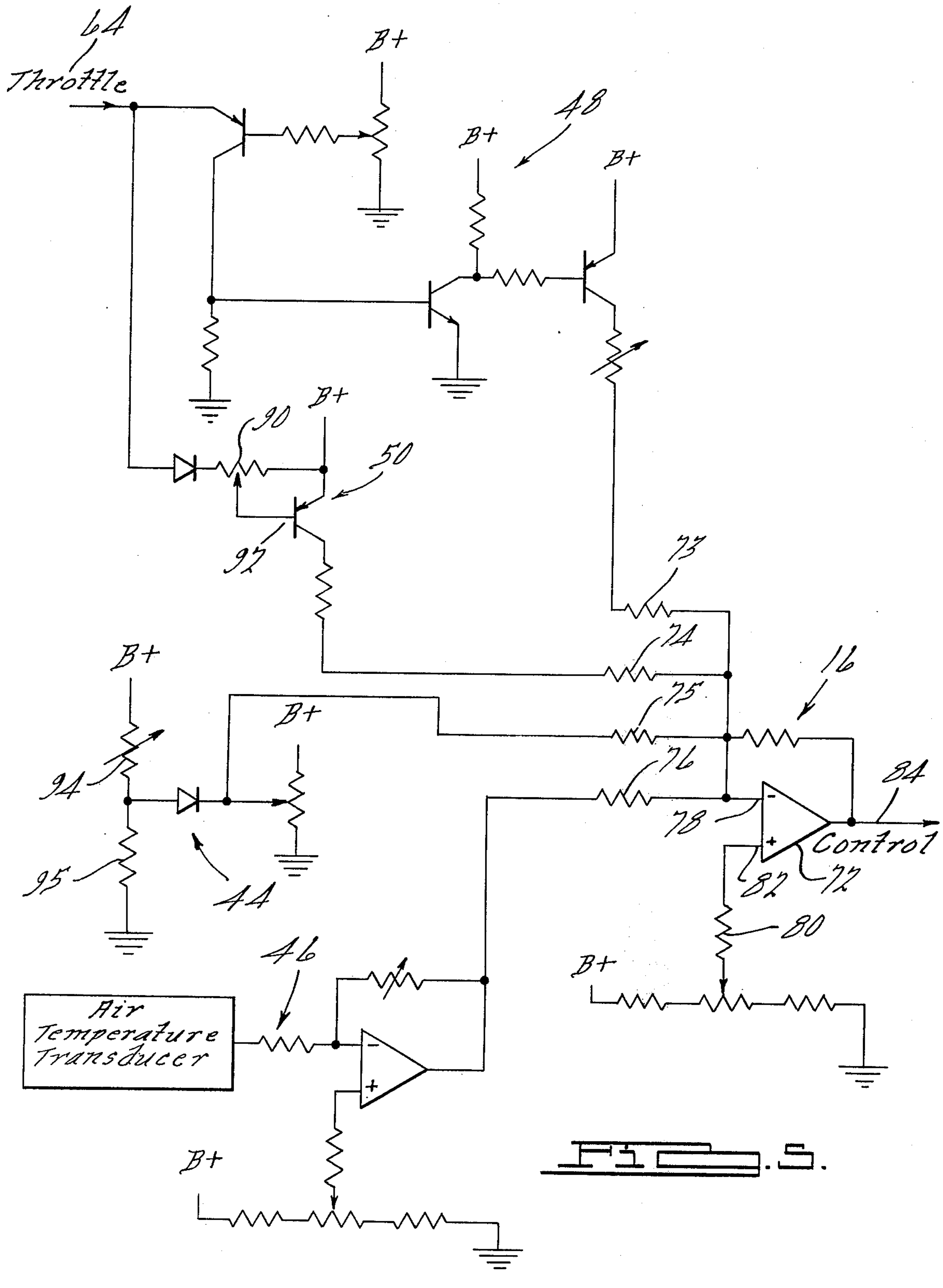
FIG. 5 is a schematic of a portion of the fuel signal control circuitry.
Figure 6:
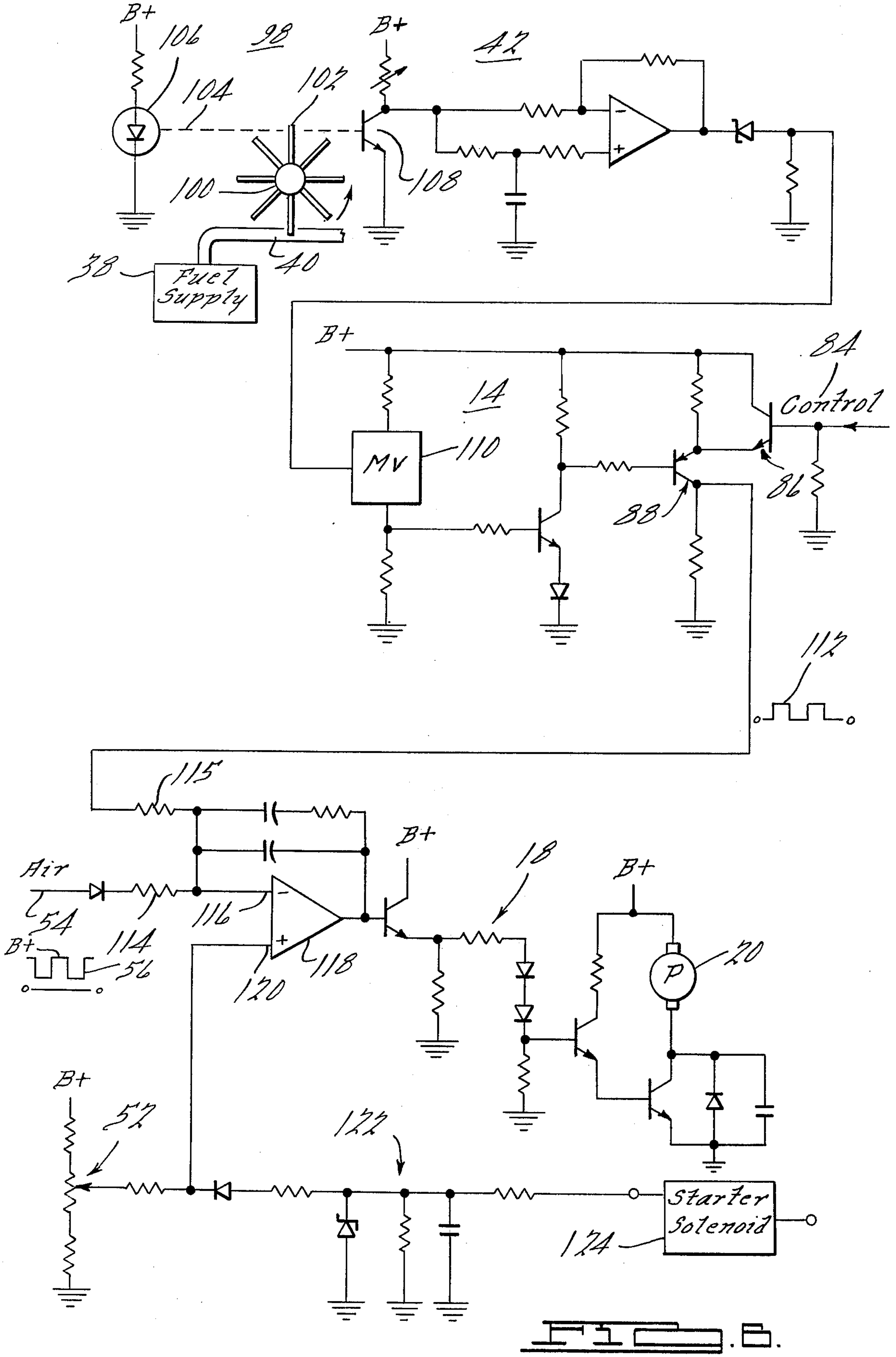
FIG. 6 is a schematic of fuel flow and pump control circuitry.

Referring to FIGS. 4–6, there is indicated in schematic form the electronic circuitry to accomplish the system of FIG. 1. It is to be appreciated that implementing the several parameters of the system may be accomplished by means different from that illustrated in these FIGS. without departing from the teaching of the system. The main active components in these FIGS. are conventional operational amplifiers such as Fairchild Semiconductor $\mu a$ 741, precision monostable multivibrators such as Texas Instruments SN 76810 and bipolar transistors such as Motorola's MPS 6514 and MPS 6518.

As previously indicated, FIG. 4 is a schematic of the air signal generation unit of the system. The output signal 54 labelled AIR, is a series or train of pulsed electrical signals 56. The base line or reference level of the signal is a voltage substantially equal to B+. The pulses 56 which have a common width as determined by the period of the monostable multivibrator 58 are negative going toward a ground reference level.

An air flowmeter 28 such as that described in the copending application of Leonard Gau entitled "Vortex Swirl Flowmeter Sensor Probe" filed on Mar. 30, 1973 having Ser. No. 346,514, now U.S. Pat. No. 3830104 positioned in the air inlet pipe of the air cleaner 24. The output of the air flowmeter probe is electrically connected to a circuit such as that described in the copending patent application of W. R. Kissel entitled "Vortex Swirl Flowmeter Sensor Circuit" filed on Mar. 30, 1973 having Ser. No. 346,513 and now abandoned. The output of the circuit is a plurality of pulsed signals representing the velocity of the air flowing into the air cleaner 26.

These signals are applied to the monostable multivibrator 58 wherein these signals from the air flowmeter 28 are shaped into square wave signals having a constant or predetermined pulse width and height. The output signals from the multivibrator 58 are applied through a level shifting and power stages to the output stage 60 of the air signal generation unit.

The output signal 54 from the air signal generation unit is controlled by the amount of air flow as described above and is also controlled by two other parameters, namely, air pressure and an operator demand vehicle acceleration. These two signals operate to control the voltage amplitude of the air pulse 56.

The air pressure parameter, as used in the system of FIG. 1, measures the absolute air pressure entering the throttle body 11. For the purposes of this system, absolute air pressure is defined as ambient or atmospheric air pressure as found in the environment of the vehicle less any pressure drops in the air measuring apparatus.

The air pressure transducer 30 is a linear device wherein the output signal from the transducer varies in a linear relationship with the pressure. This signal is applied through a pair of series connected operational amplifiers 61 and 62 to the output stage 60 of the air signal generation unit through a control transistor 63 in the emitter circuit. The function of the control transistor 63 is to provide a variable impedance in the emitter thereby allowing the amplitude of the air signal to vary. This parameter controls the amplitude of the pulse by controlling the voltage at the emitter of the output stage 60.

The operator demand vehicle acceleration signal is generated by a voltage signal taken from a tap on a potentiometer 34. As the operator moves the accelerator pedal 32 in the vehicle, this movement is translated into movement of the center tap resulting in a voltage signal that varies linearly with movement of the pedal 32. This signal is filtered and amplified to generate a "throttle" signal 64.

The throttle signal 64 is then capacitively coupled at 66 to the non-inverting input of an operational amplifier 68. The output of the operational amplifier 68 is coupled by a diode 70 to the collector circuit of the output stage 60.

The accelerator control signal on acceleration decreases the amplitude of the air signal thereby "telling" the motor control unit 18 that there is more air and, therefore, to increase the amount of fuel.

The operational amplifiers 61, 62, and 68 are balanced for normal or predetermined operating conditions and their output signals reflect changes from this predetermined operating condition.

FIG. 5 is a schematic of a portion of the fuel signal generation circuitry. In particular, FIG. 5 shows the generation of the parameters affecting the height of fuel signal.

The output stage of the control circuitry illustrated in FIG. 5 is an operational amplifier 72 wherein signals representing idle enrichment, power enrichment, engine temperature and air or fuel temperature are summed together through resistors 73–76 respectively and applied to the inverting input 78 of the operational amplifier 72. A balancing signal representing the normal or predetermined operating conditions of these parameters is applied through a resistor 80 to the non-inverting input 82 of the operational amplifier 72. The output of the operational amplifier 72 labelled "control" 84 is supplied to a control transistor 86 in the emitter circuit of the output stage 88 of the fuel signal generator.

The "throttle" signal 64 as generated on FIG. 4, is supplied to two amplifier circuits 48 and 50. The first amplifier circuit 48 generates a signal representing idle enrichment and functions in the first portion of the curve of FIG. 2. At idle enrichment, the fuel-air ratio is typically greater than the cruise or predetermined operation condition of the vehicle. Therefore, for each quantity of air, the quantity of fuel is greater than at the cruise condition. The output signal from the idle enrichment circuit 48 is electrically connected to resistor 73 of the summing network and is a large amplitude indicating the need for more fuel.

The second amplifier circuit 50 generates a signal representing the power enrichment and functions in the last portion of the curve of FIG. 2. As at idle, in the power region the amount of fuel required per quantity of air is greater than at the cruise condition. The variable resistor 90 in the base circuit of the input transistor 92 provides a threshold level to select the proper minimum voltage level from the throttle potentiometer 34. As the throttle valve 13 opens, the voltage level increases and when the throttle valve approaches maximum opening, the voltage applied to the threshold resistor 90 causes the signal applied to the resistor 74 in the summing circuit to be larger in amplitude.

The circuit 44 representing the parameter engine temperature functions to generate an electrical signal to the resistor 75 in the summing network which decreases with increasing engine temperature. The potentiometer 94 represents a choke control and as engine temperature increases, the choke is turned off and the voltage at the junction of the two resistors 94 and 95 is minimal.

The last parameter is air temperature. As the temperature of the air increases, the mass flow of the fuel decreases. This control circuit senses the temperature and generates a voltage signal to the resistor 76 in the summing network which increases with increasing temperature.

As in the air signal parameter circuit, each of the fuel parameter transducers varies linearly and generates a voltage amplitude which exhibits a linear or straight line relationship. The signal at the output of the summing resistors 73–76 is at a high voltage amplitude whenever there is a requirement for more fuel due to there parameters. Increasing fuel temperature decreases the density increased volume of flow of fuel requiring fuel. When the throttle valve 13 is in the idle or in the power position, the fuel requirement is increased when the engine temperature is low the fuel requirement is greater.

The output signal 84 of operational amplifier 72 is a voltage signal generated as a result of the comparison of the above four parameters with a voltage applied through a resistor 80 representing the normal conditions for these signals. As the summing network 73–76 generates an increasing voltage amplitude signal, the output of the operational amplifier 72 generates a decreasing amplitude signal.

Referring to FIG. 6, there is illustrated the remaining control circuitry for the fuel metering system of FIG. 1. The fuel metering system as previously explained is a closed loop control system wherein the amount of air entering the system is measured and the fuel is supplied to maintain a desired fuel-air ratio.

The fuel being delivered in the fuel delivering lines 40 is metered by a paddlewheel measuring system 98. Fuel flows through the lines 40 as a result of the operation of the fuel pump 20 and causes a paddlewheel 100 to rotate. The tips or blades 102 of the paddlewheel 100 interrupt a light path 104 from a light source 106 such as a light emitting diode to a light responsive device 108 such as a photo transistor.

The output of the photo transistor 108 is a series of pulses representing the volume of fuel flowing in the lines 40. These pulses are amplified, shaped and supplied to the input of a precision monostable multivibrator 110. The output of the multivibrator circuitry is a train or series of pulses 112 each having a predetermined width. The pulse repetition frequency is a function of the amount or volume of fuel flowing in the lines 40.

The output stage 88 of the fuel signal generator is similar to that of the air signal generator in that the control signal 84 from FIG. 5 is applied to the base circuit of the control transistor 86. The output from the multivibrator is amplified and shaped and is applied to the base circuit of the output stage 88.

The fuel signal is a train or series of pulses 112 having a base reference of essentially ground and a voltage height inversely proportional to the amount of fuel desired. Thus, an increase in fuel demand results in a decrease in pulse amplitude.

The air signal and the fuel signal are relatively ratioed with respect to each other and in the present embodiment this is accomplished by the two signals being applied to the resistors 114 and 115 respectively in the summing network at the inverting input 116 of an operational amplifier 118. The non-inverting input 120 is connected to a system balancing voltage circuit representing the fuel-air ratio at the predetermined operating conditions.

These two signals, the summed signal, and the system balancing signal are integrated by the operational amplifier 118 and the result is applied to the motor control 18 of the fuel pump 20. As previously indicated, the amount of fuel supplied by the pump 20 is determined from the mass of the air entering the throttle body 11. Both air and fuel signals are corrected by parameters necessary for mass corrections.

The system balancing circuit 52 is further controlled by a starting signal circuit 122. When the vehicle is initially started the predetermined fuel-air ratio is altered. Once the starter solenoid 124 is de-energized, the system balancing network 52 returns to its normal state.

Figure 7:
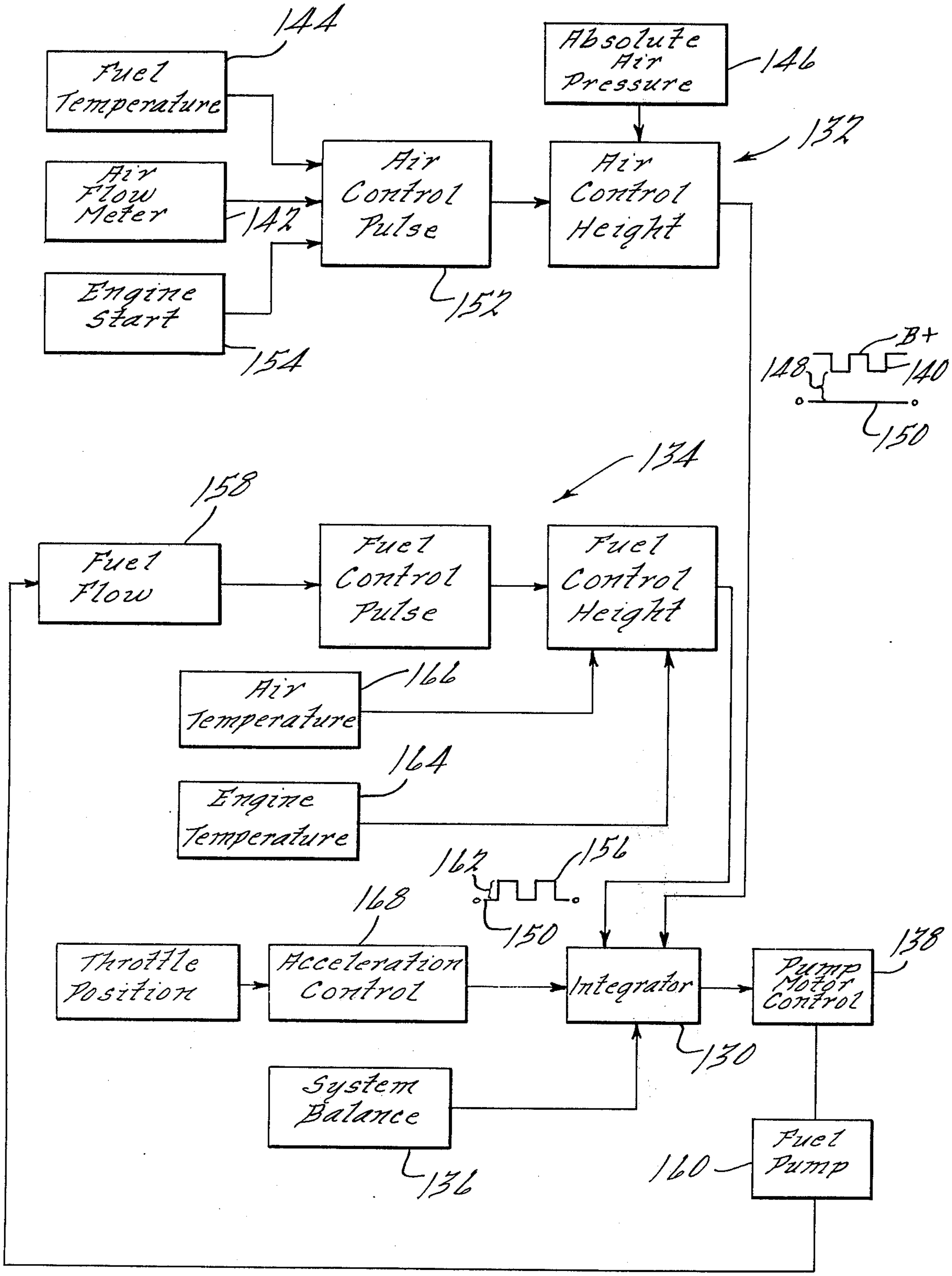
FIG. 7 is a block diagram of another fuel metering system according to the present invention.

Referring to FIG. 7 there is illustrated a system block diagram of another fuel metering system embodying principles of the present invention. In this system the several system parameters are applied to the control network at different points. As in the system of FIG. 1, the parameters are to correct for the mass measurements of both the air and the fuel.

The system of FIG. 7 is also a closed loop system wherein the air is measured, the fuel is pumped and the amount of fuel supplied is metered to thus close the control loop. The system operates to maintain a predetermined fuel-air mass ratio and the several control signals operate to adjust the fuel or the air signals to maintain the ratio according to the car operating conditions.

As in the system of FIG. 1, the integrator 130 receives signals from the air control system 132 and the fuel control system 134. These signals are summed and compared against a signal from the system balancing system 136. The result is integrated and applied to a pump motor control and driver unit 138.

In the system of FIG. 7, the air signal is a pulse 140 having a base line equal to the system voltage level. The pulse repetition rate of the air signal is determined by the volume of the air entering into the throttle body, as measured by an air flowmeter 142. The width of the air signal is determined by the temperature of fuel as measured by a temperature transducer 144 with the relationship of increasing width for increasing fuel temperatures.

The height of the air signal is determined by the absolute pressure of the air entering the throttle body and is measured by a pressure transducer 146 in the air cleaner. The result of these parameters is a pulse 140 depending from a base line equal to the voltage of the system wherein the voltage height 148 of the bottom of the pulse signal from a ground reference level 150 is the pulse control height.

Interjected into the air signal width control 152 is a signal representing engine start 154. This signal operates to have fuel delivered to the throttle body as the vehicle is being started and before any vacuum build up in the manifold takes place. Once vacuum is built up, then air flow is measured and the fuel is supplied according to the system.

The fuel signal 156 generated in the system of FIG. 7 is a positive-going pulse having a reference level equal to ground potential 150. The width of the pulse is constant and the pulse repetition frequency is determined by the volume of fuel being delivered in the fuel lines. This signal representing fuel flow 158 is determined by metering the fuel delivered by the fuel pump 160.

One form of pump metering is to connect a disc to the armature shaft of the pump motor. Equally spaced around the periphery of the disc are a plurality of indicies such as teeth or light-dark areas. Adjacent to the periphery of the disc is a transducer means which is responsive to the rotation of the indicies around the armature shaft for generating an electrical signal. The transducer means may be any of the well known electromagnetic transducers or photo-electric transducers. The output of the transducers is electrically connected to an amplifier shaper circuit for the generation of a digital voltage signal.

With such an arrangement, the volume fuel displacement for each stroke of the pump is known. The relationship between the indicies and the stroke of the pump is known and, therefore, the relationship between the digital signal from the transducer means which is the fuel measuring means and the volume of fuel being displaced in the fuel lines is known. The more fuel being displaced will result in a higher pulse repetition frequency from the fuel flow measuring means 158.

The pulse height 162 of the fuel signal 156 is controlled by signals representing engine temperature 164 and air temperature 166. As the engine temperature increases, the height 162 of fuel pulse 156 is increased and as the air temperature increases, the height of fuel pulse is increased; however, neither temperature response is dependent upon the other.

The above corrections for both fuel and air are for the purpose of providing a fuel-air ratio in terms of the mass of the fuel and the mass of the air. Therefore, the fuel metering system of FIG. 7 provides the correct fuel-air ratio for an internal spark combustion engine regardless of the mass of either the fuel or the air. The corrections for each quantity are independent of the other to provide the degree of accuracy required for excellent engine performance.

The summing signal comprising the fuel signal 156 and the air signal 140 may be modified according to the operator of the vehicle. If the vehicle is in an acceleration mode wherein the fuel-air mixture must be richer, an acceleration control signal 168 is generated to modify the summing signal at the input to the integrator 130.

The motor control unit 138 which is responsive to the electrical signals generated by the integrator 130 controls the motor driving the fuel pump 160. The control unit 138 either drives the pump motor causing fuel to be delivered or brakes the pump motor preventing unwanted fuel from entering the throttle body.

There has thus been shown and described a fuel metering system for spark ignition engines. The system corrects the fuel-air ratio to account for changes in the mass of the fuel, the mass of the air and the operator demands on the engine, the result being a superior engine performance at all operating conditions.

What is claimed is:

1. A fuel metering system for maintaining a predetermined fuel-air mass ratio for an engine comprising:

a. means for generating an air signal having a magnitude representative of the mass flow of air into the engine at a set of given values for a set of ambient parameters;

b. fuel pumping means for pumping fuel in accordance with a control signal applied thereto;

c. mixing means for mixing fuel pumped by said fuel pumping means with the air entering the engine;

d. a fuel flow transducer circuit means comprising a fluid flow transducer means disposed in fluid circuit between said fuel pumping means and said mixing means to measure fuel pumped by said fuel pumping means to said mixing means and an output circuit means operatively associated with said fluid flow transducer means to provide a fuel signal having a magnitude representative of the mass flow of fuel pumped by said fuel pumping means to said mixing means at said set of given values for said set of ambient parameters;

e. and control circuit means for providing said control signal, said control circuit means including means for providing a reference fuel-air ratio signal representative of said predetermined fuel-air mass ratio, means for relatively ratioing said fuel signal and said air signal with respect to each other to provide an actual fuel-air mass ratio signal, and means for establishing said control signal in accordance with said actual and said reference fuel-air mass ratio signals such that said fuel pumping means delivers the correct mass fuel flow to said mixing means for securing substantial correspondence between said actual and said reference fuel-air mass ratio signals;

f. wherein both said air signal and said fuel signal are pulse waveforms composed of repetitive pulses each having given pulse dimensions representing a given mass of the corresponding fluid and further including one correction circuit means for correcting one of said pulse waveforms in response to change in one of said ambient parameters of said set of ambient parameters from its given valve and another correction circuit means for correcting the other pulse waveform in response to change in another ambient parameter of said set of ambient parameters from its given value; and g. wherein said one correction circuit means is responsive to a change in an ambient parameter which changes the mass flow of the fluid whose mass flow is represented by said other waveform and said another correction circuit means is responsive to a change in an ambient parameter which changes the mass flow of the fluid whose mass flow is represented by said one waveform.

2. A fuel metering system as claimed in claim 1. wherein a change in fuel temperature is used to correct the air signal and a change in air temperature is used to correct the fuel signal.

3. A fuel metering system for maintaining a predetermined fuel-air mass ratio for an engine comprising:

a. air signal generating means for generating an air signal composed of a series of repetitive pulses which repeat at a rate representative of the volume of air flow into the engine and each of which has predetermined pulse dimensions which are representative of a predetermined mass of air for a set of given values for a set of ambient parameters;

b. fuel metering means for metering fuel;

c. mixing means for mixing the fuel metered by said fuel metering means with the air entering the engine;

d. said fuel metering means comprising, 1. ratio signal means for supplying a given fuel-air signal representative of a predetermined fuel-air mass ratio.

2. a source of variable magnitude voltage, 3. electrically operable fuel pump means operatively coupled with said source of variable magnitude voltage for pumping fuel to said mixing means in accordance with the magnitude of the voltage of said source, 4. fuel transducer means for providing an output fuel signal composed of a series of repetitive pulses which repeat at a rate representative of the volume of fuel flow into said mixing means and each of which has predetermined pulse dimensions which are representative of a predetermined mass of fuel at said set of given values for said set of ambient parameters, 5. ratioing means for ratioing said fuel signal and said air signal with respect to each other to develop an actual fuel-air ratio signal, 6. and regulating means operatively coupled with said ratioing means, said ratio signal means, and said source of variable magnitude voltage for causing the magnitude of said source to be regulated such that the mass flow of fuel, as represented by said fuel signal, and the mass flow of air, as represented by said air signal are relatively ratioed to secure substantial correspondence between said actual fuel-air ratio signal and said given fuel-air ratio signal, e. and correction means responsive to change in the value of one of said ambient parameters from its given value for correcting a pulse dimension of one of said fuel and air signals.

4. A fuel metering system for maintaining a predetermined fuel-air mass ratio for an engine comprising:

a. air signal generating means for generating an air signal composed of a series of repetitive pulses which repeat at a rate representative of the volume of air flow into the engine and each of which has predetermined pulse dimensions which are representative of a predetermined mass of air for a set of given values for a set of ambient parameters;

b. fuel metering means for metering fuel;

c. mixing means for mixing the fuel metered by said fuel metering means with the air entering the engine;

d. said fuel metering means comprising, 1. ratio signal means for supplying a given fuel-air signal representative of a predetermined fuel-air mass ratio, 2. a source of variable magnitude voltage, 3. electrically operable fuel pump means operatively coupled with said source of variable magnitude voltage for pumping fuel to said mixing means in accordance with the magnitude of the voltage of said source, 4. fuel flow transducer means for providing an output fuel signal composed of a series of repetitive pulses which repeat at a rate representative of the volume of fuel flow into said mixing means and each of which has predetermined pulse dimensions which are representative of a predetermined mass of fuel at said set of given values for said set of ambient parameters, 5. ratioing means for ratioing said fuel signal and said air signal with respect to each other to develop an actual fuel-air ratio signal, 6. and regulating means operatively coupled with said ratioing means, said ratio signal means, and said source of variable magnitude voltage for causing the magnitude of said source to be regulated such that the mass flow of fuel, as represented by said fuel signal, and the mass flow of air, as represented by said air signal are relatively ratioed to secure substantial correspondence between said actual fuel-air ratio signal and said given fuel-air ratio signal, e. and correction means responsive to change in the value of one of said ambient parameters from its given value for correcting a pulse dimension of one of said fuel and air signals wherein a change in air temperature is used to correct said fuel signal.

5. A fuel metering system for maintaining a predetermined fuel-air mass ratio for an engine comprising:

a. air signal generating means for generating an air signal composed of a series of repetitive pulses which repeat at a rate representative of the volume of air flow into the engine and each of which has predetermined pulse dimensions which are representative of a predetermined mass of air for a set of given values for a set of ambient parameters;

b. fuel metering means for metering fuel;

c. mixing means for mixing the fuel metered by said fuel metering means with the air entering the engine;

d. said fuel metering means comprising, 1. ratio signal means for supplying a given fuel-air signal representative of a predetermined fuel-air mass ratio, 2. a source of variable magnitude voltage, 3. electrically operable fuel pump means operatively coupled with said source of variable magnitude voltage for pumping fuel to said mixing means in accordance with the magnitude of the voltage of said source, 4. fuel flow transducer means for providing an output fuel signal composed of a series of repetitive pulses which repeat at a rate representative of the volume of fuel flow into said mixing means and each of which has predetermined pulse dimensions which are representative of a predetermined mass of fuel at said set of given values for said set of ambient parameters, 5. ratioing means for ratioing said fuel signal and said air signal with respect to each other to develop an actual fuel-air ratio signal, 6. and regulating means operatively coupled with said ratioing means, said ratio signal means and said source of variable magnitude voltage for causing the magnitude of said source to be regulated such that the mass flow of fuel, as represented by said fuel signal, and the mass flow of air, as represented by said air signal are relatively ratioed to secure substantial correspondence between said actual fuel-air ratio signal and said given fuel-air ratio signal, e. and correction means responsive to change in the value of one of said ambient parameters from its given value for correcting a pulse dimension of one of said fuel and air signals wherein a change in fuel temperature is used to correct said air signal.

6. A fuel metering system as claimed in claim 3. wherein a change in air pressure is used to correct said air signal.

7. A fuel metering system as claimed in claim 3. wherein said fuel flow transducer means includes a fluid flow transducer disposed in fluid circuit relationship between said fuel pump means and said mixing means.

8. A fuel metering system as claimed in claim 3. wherein said air signal and said fuel signal are relatively ratioed with respect to each other by algebraically summing the two signals.

9. A fuel metering system as claimed in claim 8. wherein said regulating means includes an integrator circuit means operatively coupled to receive the summed fuel and air signals and to integrate same with respect to said given fuel-air ratio signal.

10. A fuel metering system as claimed in claim 3. wherein said ratio signal means includes means for selectively adjusting the magnitude of said given fuel-air ratio signal over a range of values.

11. A fuel metering system as claimed in claim 3. including further a second correction means responsive to change in the value of another of said ambient parameters from its given value for correcting a pulse dimension of one of said fuel and air signals.

12. A system for maintaining a predetermined mass flow ratio between two fluids which are combined in an engine to form a combustible mixture which is combusted to power the engine, the first of said fluids exhibiting a decrease in mass flow the magnitude of which decrease is in direct proportion to the magnitude of an increase in one ambient parameter of a set of ambient parameters, said system comprising:

a. means for providing a first signal whose magnitude is representative of the mass flow of said first fluid into the engine for a set of given values for the ambient parameters of said set but becomes decreasingly representative of the mass flow of said first fluid into the engine as the value of said one parameter of said set progressively increases from its said given value;

b. means for providing a second signal whose magnitude is representative of the mass flow of the second of said fluids into the engine;

c. means for providing a reference signal having a magnitude representative of said predetermined mass flow ratio;

d. control means responsive to said first signal, said second signal and said reference signal for controlling the mass flow into the engine of one of said fluids relative to the other of said fluids such that the ratio between the magnitudes of said first and second signals is caused to be equal to the magnitude of said reference signal;

e. said control means including correction means for correcting said second signal in accordance with changes in said one ambient parameter;

f. said correction means including means for providing a correction signal which changes in direct proportion to change in said one ambient parameter and means responsive to said correction signal for causing the magnitude of said second signal to be adjusted in direct proportion to said correction signal.

13. A system as claimed in claim 12. wherein said one parameter is temperature.

14. A system as claimed in claim 12. further including additional correction means for correcting said first signal according to change in an ambient parameter which affects the second fluid in the same manner as said one ambient parameter affects said first fluid.

15. A system as claimed in claim 12. wherein said correction means comprises linear correction means for correcting said signal in linear direct proportion to change in said one ambient parameter.

* * * * *